United States Patent Office 2,731,770
Patented Jan. 24, 1956

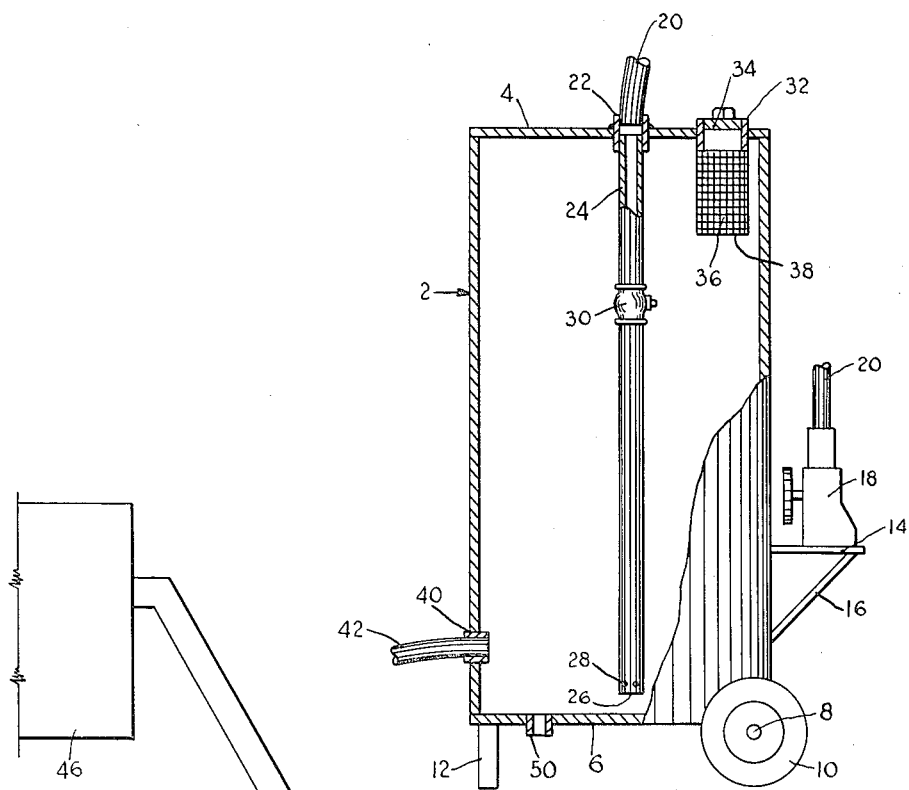
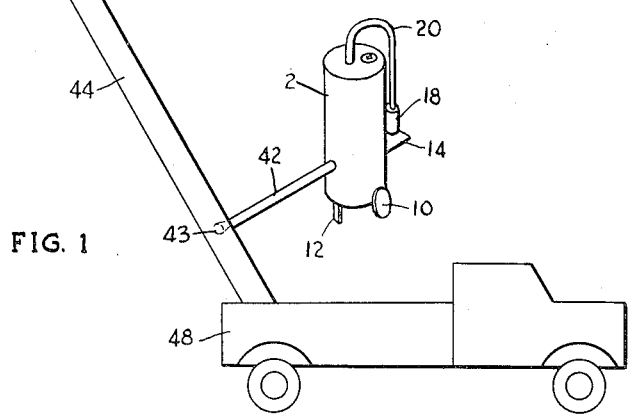

2,731,770

METHOD OF TREATING SEEDS

John E. Rhea, Billings, Okla., assignor of one-half to Donald L. Curby, Billings, Okla.

Application March 26, 1951, Serial No. 217,517

1 Claim. (Cl. 47—58)

This invention relates to an improved method of treating grains and more particularly, but not by way of limitation, to a method of treating wheat grain or wheat that is to be used for seeding purposes.

It is well known that grain seed, such as wheat and the like, must be treated prior to planting in order to preserve the seeds against deterioration. If the seed is not treated before planting, it frequently becomes subjected to root rot and an accumulation of smut which damages the seed and decreases the ultimate yield from the crop. Several methods have been devised to prevent deterioration of the grain or seed. However, most of these methods utilized a poisonous type of powdered or dust treating compound for covering the seed as it is being discharged from a bin into a truck or wagon immediately prior to planting. It is readily seen that these methods are very hazardous in that the poisonous dust frequently filters through the feed conduits and comes in contact with the operators. These poisonous dusts cause a breaking out and considerable pain when they come in contact with the human skin and are in some instances fatal.

The present invention contemplates a method of treating grain or seeds with a powdered treating compound of the poisonous type, but the treating compound is formed into an emulsion with water to eliminate the detrimental characteristics of filtered dust. After the treating compound is formed into an emulsion with water, the emulsion is forced under pressure onto the wheat seed as the wheat seed is discharged from a wheat bin into any suitable transportation means such as a truck or the like immediately prior to the planting of the seed. The emulsified treating compound is introduced into an intermediate portion of the conduit leading from the wheat bin in such a manner that substantially each grain of wheat flowing through the conduit is provided with a coat of the treating compound. The liquefied or emulsified condition of the poisonous treating compound prevents the possibility of dust filtering through the conduits and coming into contact with the operators.

An important object of this invention is to provide an improved method of treating wheat seed or grain with a liquefied treating compound.

Another object of this invention is to provide a method of treating wheat seed or grain with a liquefied treating compound to increase the safety of personnel utilized in the treating operation.

Another object of this invention is to provide an improved method of treating wheat seed or grain in such a manner to substantially eliminate the disbursement of poisonous dust during the treating operation.

A further object of this invention is to provide a simple and efficient method of treating wheat seed or grain immediately prior to planting the seeds.

Another object of this invention is to provide a method of treating wheat seeds which may be accomplished during the usual loading or unloading of the wheat seed and without prolonging the loading or unloading operation.

A still further object of this invention is to provide a method of treating wheat seed or grain with a liquefied treating compound which includes agitation of the liquefied treating compound immediately prior to its application on the wheat seed to maintain the composition of uniform consistency and strength.

Other objects and advantages of the invention will be evident from the following detailed description, read in conjunction with the accompanying drawings, which illustrate my invention.

In the drawings:

Figure 1 is a schematic view of one arrangement of the necessary apparatus utilized in practicing the present invention.

Figure 2 is a vertical sectional view partially in elevation of a container for the liquefied treating compound.

Referring to the drawings in detail, and particularly Figure 2, reference character 2 generally designates a container, preferably of cylindrical configuration and enclosed at its upper and lower ends 4 and 6 respectively. An axle 8 is secured to the lower plate 6 of the container 2 and has suitable wheels 10 secured on the opposite ends thereof to support the container. A vertical leg 12 depends from the plate 6 diametrically opposite the axle 8 to assist the wheels 10 in supporting the container 2 when the container is in a stationary position as shown. A table or platform 14 is provided on the outer periphery of the container 2 and is supported thereon by suitable braces 16. An air compressor 18 is disposed on the platform 14 and is adapted to be driven by any suitable type of power unit (not shown). The compressor 18 is connected by a conduit 20 to a coupling 22 provided in the central portion of the upper plate 4 of the container 2. A vertically disposed conduit or pipe 24 is suitably secured in the coupling 22 and extends downwardly in the container 2 into proximity with the lower plate 6. The lower end 26 of the conduit 24 is enclosed by a suitable plate or plug (not shown). A plurality of circumferentially spaced apertures 28 are provided in the conduit 24 adjacent the lower enclosed end 26 thereof for purposes as will be hereinafter set forth. A suitable check valve 30 is interposed in the conduit 24 to regulate the internal pressure of the container 2 when the compressor 18 is forcing air into the container as will be more fully hereinafter set forth.

An enlarged coupling 32 is provided in the top plate 4 in spaced relation to the coupling 22 to provide an inlet for treating compound into the container 2. The coupling 32 is normally closed by a suitable plug 34 and has a cylindrically shaped screen member 36 secured thereto within the container 2. The lower end 38 of the screen member 36 is enclosed. The screen member 36 merely acts as a strainer to remove debris from the treating compound as it is being injected into the container 2.

A coupling 40 is provided in the side of the container 2 in upwardly spaced relation to the apertures 28. The coupling 40 is connected by a suitable flexible conduit 42 to the intermediate portion of a grain conduit 44 leading from a grain bin shown schematically at 46 to a truck or the like 48. A suitable valve (not shown) is interposed in the conduit 42 and a suitable spray head 43 is provided on the conduit 42 for purposes as will be hereinafter set forth.

An outlet 50 is provided in the lower plate 6 to drain the container 2 in the usual manner. The outlet 50 is provided with a suitable plug or valve (not shown) which is periodically removed or opened to drain the container 2 and remove sediment therefrom.

Operation

In operation, suitable treating compound in powdered or dust form is thoroughly mixed with water and then poured through the coupling 32 into the container 2.

The level of the mixture is raised in the container 2 to a point substantially above the outlet conduit 42. The level of the mixture may be readily determined by a suitable liquid level gauge (not shown) on the container 2. The air compressor 18 is then placed in operation to force air through the conduits 20 and 24 and the apertures 28 into the lower portion of the container 2. It will be noted that the apertures 28 are disposed below the level of the mixture. Therefore, as air is forced under pressure through the apertures 28 the mixture will be thoroughly agitated to form an emulsion of the treating compound in the water. When the pressure in the container 2 has been raised to a desired degree, the valve (not shown) in the conduit 42 is opened to establish communication between the container 2 and the grain chute 44. The emulsion is then forced through the conduit 42 and sprayed into the grain chute 44. Wheat grain being transferred through the conduit 44 from the storage bin 46 to the truck 48 will thereby be subjected to the emulsion when passing the interconnection of the conduit 42 with the grain chute 44. A baffle (not shown) is preferably provided in the grain chute 44 upstream of the conduit 42 to disperse the wheat grains as they pass through the spray of the emulsion, thereby assuring that each grain of wheat will be subjected to the emulsion and be provided with a continuous coat of the treating compound.

It will be readily seen that since the emulsion is sprayed into an intermediate portion of the grain chute 44 the operators will not come in contact with the poisonous treating compound. The treating compound will be substantially dry by the time the treated wheat grains are discharged from the grain chute 44 into the truck 48, thereby assuring that the treating compound will not flow or drip off of the wheat grains as the grains are being loaded into the truck 48.

From the foregoing it is apparent that the present invention provides a novel method of treating wheat seed or grain in such a manner to substantially eliminate the disbursement of poisonous dust during the treating operation to increase the safety of personnel utilized in treating the grain. The wheat grain or seed may be simply and efficiently treated during the usual loading or unloading of the wheat seed and without prolonging the loading or unloading operation. It is also apparent that the present invention provides a method of treating any type of seed or grain prior to the planting thereof.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A method of treating grains with a poisonous preserving compound during the unloading thereof from a bin in a manner to prevent any filtration of the poisonous preserving compound, which consists of discharging the grain from a bin in a closed grain chute, spraying the discharging grain with an aerated and agitated mixture of the poisonous compound at an intermediate portion of the grain chute, dispersing the grains in the chute upstream from the point of spraying to assure an efficient coating of each grain.

References Cited in the file of this patent

UNITED STATES PATENTS

| | | |
|---|---|---|
| 1,264,438 | Rasmussen | Apr. 30, 1918 |
| 1,505,781 | Hart | Aug. 19, 1924 |
| 1,793,922 | Funk | Feb. 24, 1931 |
| 2,313,190 | Bary | Mar. 9, 1943 |
| 2,324,874 | Peters | July 20, 1943 |
| 2,504,009 | DePhillips | Apr. 11, 1950 |
| 2,579,733 | Burgesser | Dec. 25, 1951 |
| 2,618,103 | Streets | Nov. 18, 1952 |